United States Patent [19]

Takeda

[11] Patent Number: 4,853,921
[45] Date of Patent: Aug. 1, 1989

[54] METHOD FOR STORING DATA IN ROTARY TYPE RECORDING MEDIA

[75] Inventor: Haruo Takeda, Kawasaki, Japan
[73] Assignee: Hitachi, Ltd., Tokyo, Japan
[21] Appl. No.: 39,748
[22] Filed: Apr. 20, 1987
[30] Foreign Application Priority Data Apr. 18, 1986 [JP]  Japan .................................. 61-87919

[51] Int. Cl.$^4$ .............................................. G11B 19/02
[52] U.S. Cl. ........................................ 369/59; 360/48
[58] Field of Search .................... 360/48, 72.2; 369/47, 369/48, 49, 59, 56, 57, 32, 111

[56] References Cited

U.S. PATENT DOCUMENTS 4,545,044 10/1985 Satoh et al. ........................... 369/58

FOREIGN PATENT DOCUMENTS 2091021 7/1982 United Kingdom .................. 369/47

OTHER PUBLICATIONS

Hitac Manual Program Product VOS3 Date Management/Optical Disk Support (Manual No. 8090-3-18-3-10) by Hitachi, Ltd.

Primary Examiner—Vincent P. Canney
Assistant Examiner—Kevin J. Fournier
Attorney, Agent, or Firm—Antonelli, Terry & Wands

[57] ABSTRACT

Herein disclosed is a method for storing data in a rotary type recording medium rotating in a predetermined direction in which the read of the information from one track to an adjacent track is conducted substantially continously when the head is moved in the first direction but discontinuously when the head is moved in a second direction reversed from the first one. The data is stored in at least one storage area on the recording medium such that data blocks are written in the order of tracks in the second direction, such that the newest data block leads in each track, and such that the data blocks in the storage area are read in the order from the newest one when the head is moved in the first direction.

7 Claims, 3 Drawing Sheets

METHOD FOR STORING DATA IN ROTARY TYPE RECORDING MEDIA

FIELD OF THE INVENTION

The present invention relates to a method for storing data in recording medium and, more particularly, to a method for storing data in a rotary type recording media, which is suitable for a file system utilizing a non-erasable type optical disk having spiral tracks.

DESCRIPTION OF THE PRIOR ART

In the field of office automation or the like, there is an increased need to manage massive amount of data, and a file system utilizing an optical disk which has a large information storage capacity is advantageous for this purpose.

A method for storing data in the optical disk of the non-erasable type, in which recorded data can neither be physically erased nor rewritten as new data, is disclosed on pp. 5 to 8 of HITAC Manual Program Product VOS3 Data Management/Optical Disk Support (Manual No. 8090 - 3 - 183 - 10) issued by Hitachi, Ltd., for example. The optical disk described by the above article is different from a conventional memory device, such as a magnetic disk, in that the individual tracks on the recording medium run spirally and in that a data read/write head can be continuously moved from one track to an adjacent track. This makes it possible to read and write the data at a high speed while continuously accessing the plural tracks.

In case the optical disk of this kind is used in a file system, the information to be recorded in the optical disk is composed of a data block forming the record body and an index containing, for example, a keyword for retrieving the data block, as has been described in the above-specified HITAC manual. These respective data blocks and indexes are stored sequentially in the order of data entering in the individual tracks in the direction of the aforementioned continuously accessible spiral.

However, it is impossible in the non-erasable type optical disk to physically erase or rewrite data once it has been recorded in the storage area of the recording medium. In this recording medium, the data registered later generally has a more important meaning than the previous data. For example, in such a case that a part of a registered record is required to be updated, a new data record is added to another area to replace the old record, while leaving the old data record in the recording medium. That is, only the new data record added later has a substantial meaning among the plural data records having the same identifiers. As a result, if a data retrieval is carried out in the file system using the recording medium of that kind, it is advantageous for high retrieving efficiency to sequentially read at least the index from the newest one of the recorded records to effect keyword matching of the like.

In the optical disk having been subjected to data registration by the aforementioned data storing method of the prior art, however, if it is required to read data sequentially from the newest data record, the data read head has to conduct a seeking action for each rotation of the disk so that it may be returned to a track spaced by two tracks from the present position, even if the data is read in units of a track, for example. The time period required for seeking those two tracks is longer than that for which the R/W head passes through a gap between two sectors on the common track. As a result, in case the tail sector of an N-th track has been read to seek an (N−1)-th track, the head sector of the (N−1)-th track has already passed through the R/W head at the instant when the head reaches the (N−1)-th track. This raises a problem that one must wait for one more rotation for each reading action of one track, undesirably lengthens the time period for retrieval.

SUMMARY OF THE INVENTION

An object of the present invention is to solve the above-specified problem and to speed up the data retrieval of a file system using a rotary type recording medium such as the nonerasable type optical disk.

In order to achieve such object, according to the present invention, there is provided a method for storing data in a rotary type recording medium rotating in a predetermined direction in which the reading of information from a plurality of adjacent tracks is conducted at a higher speed when a head is moved in a first direction than that when the head is moved in a second direction opposite from the first direction and includes the steps of:

rotating said recording medium in said predetermined direction;

obtaining a first address for indicating a location storing the newest data block within a predetermined storage area including a plurality of tracks defined on the recording medium;

determining from the first address a second address for indicating a location to store a subsequent data block to be added to the storage area so that a plurality of data blocks stored in the storage area may be located to pass sequentially from the newest one through the head when the head is moved in the first direction; and writing the new data block into the recording medium by positioning the head at the second address.

In case an optical disk is used, since the plural tracks continuously run in a spiral shape, the second address is determined by setting as the first direction the head moving direction in which the head continuously follows the spiral.

The data block writing order in the storage area is in accordance with the order of the tracks of the second direction, and the newest data block leads each of the tracks.

According to the present invention, if the information to be stored is composed of data blocks forming the record body block and an index block to retrieve the record, first and second storage areas are defined on the recording medium, the first one being stored with the data blocks in the order of the tracks counted along the first direction of the head and in the order of passage of the head in each track, and the second one being stored with the index blocks in the order corresponding to the aforementioned storage area. Thus, when in a data retrieval, the index blocks can be continuously read sequentially from the newest one while moving the head in the first direction, to instantly judge whether or not the corresponding data of the first area is valid.

The foregoing and other objects, advantages and novel features of the present invention will be understood from the following detailed description when read in connection with the accompanying drawings.

DESCRIPTION OF THE PREFERRED EMBODIMENTS

One embodiment of the present invention will be described in detail in the following in connection with an image file system which utilizes the non-erasable type optical disk having spiral tracks.

Figure 1:
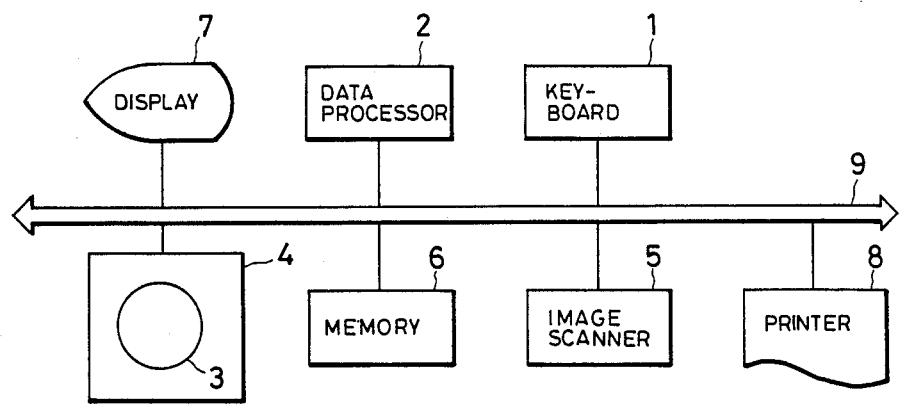
FIG. 1 is a block diagram showing one embodiment of the file system to which the present invention is applied.

FIG. 1 is a block diagram showing the overall structure of the image file system. This system is constructed of a keyboard 1 acting as an input unit for index data; a data processor 2 adapted to be operated by a program stored therein; an optical disk unit 4 for recording and reproducing data in and from an optical disk 3 having spiral tracks; an image scanner 5 acting as an image data input unit; a memory 6 for temporarily storing image data or index data; a display 7 for displaying input/output data; a printer 8; and a bus 9 interconnecting these components. In response to an instruction of the data processor 2, the present system first reads image data from the image scanner 5, when in a data registration mode, and then stores the data in a predetermined storage area of the optical disk 3 through the memory 6. Next, the system receives from the keyboard 1 the index data, such as sorts or keywords for retrieving those image data and stores them together with the address information of the image data on the optical disk through the memory 6. When in a data retrieval mode, on the other hand, inquiry information such as sorts, keywords and so on of desired image data are inputted from the keyboard 1. The data processor 2 reads out the index data sequentially from the index areas of the optical disk 3 to compare them with the specified data from the keyboard 1. The coincident data are displayed on the display 7. If the operator selects a desired one from the index data displayed to select its number or the like through the keyboard 1, the optical disk 3 is accessed on the basis of the aforementioned image data address information corresponding to those index data so that the corresponding image data is read into the memory 6 and displayed on the display 7. The operator can output the hard copy of the displayed image to the printer 8.

Figure 2:
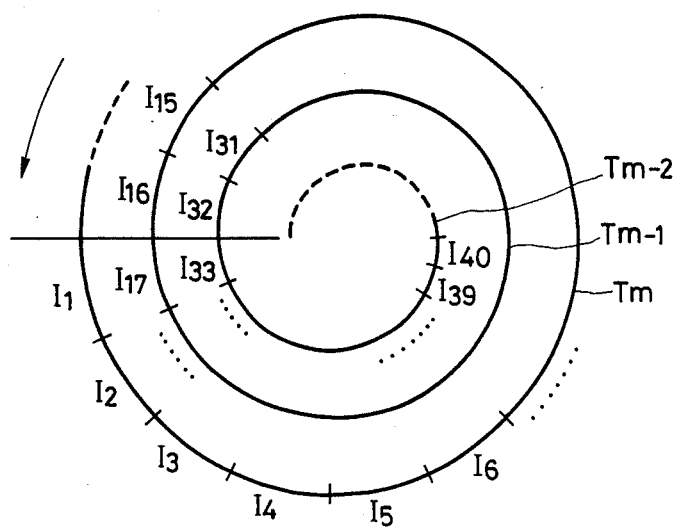
FIG. 2 is a diagram showing a portion of the tracks in an index data storage area on a recording medium.

Next, the format for storing the index data in the optical disk 3 will be described in the following. FIG. 2 schematically shows the tracks in an index data area which is one of the storage areas on the optical disk 3. In this example, this optical disk 3 is driven to rotate counter-clockwise, and a read/write head (not shown) is driven to reciprocate along a radial direction of the optical disk 3 so that an arbitrary one of the tracks is accessed. This drive makes it possible to continuously access the tracks from the inside to the outside thereby to read the data sequentially in that direction at a high speed. Reference letters $I_1$ to $I_{40}$ appearing in FIG. 2 denote the individual index data, and their subscripts denote the order of storing the individual index data. The index data $I_{40}$ is the newest one at the time considered, and the inner ones following $I_{40}$ are yet to be written.

Figure 3:
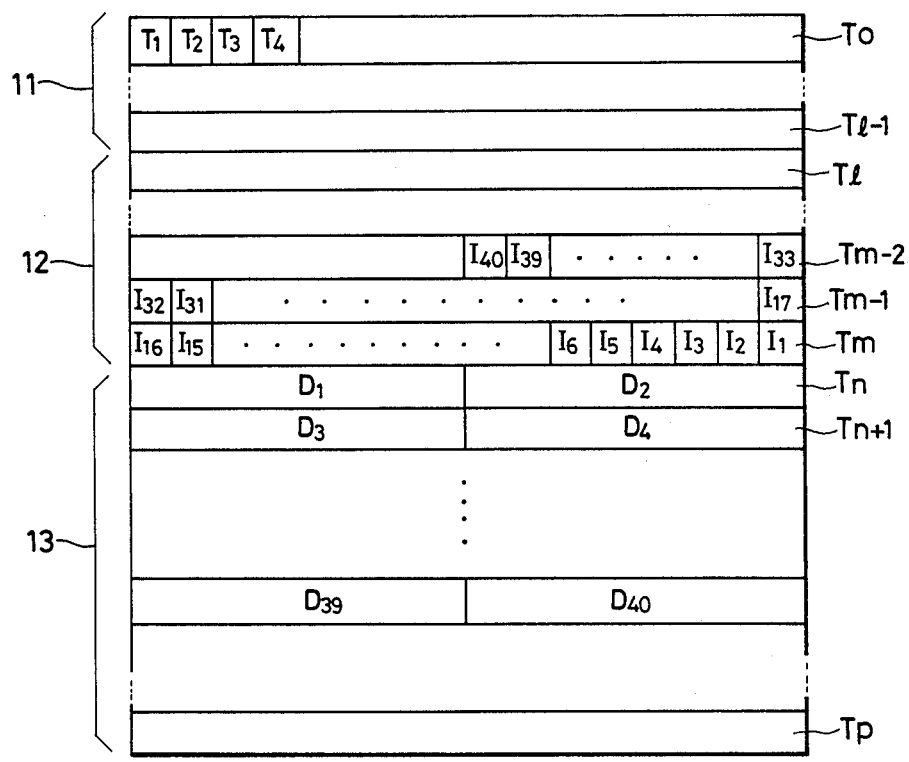
FIG. 3 is a diagram for explaining the relations between the arrangement of storage areas on the recording medium and the stored data.

FIG. 3 is a diagram showing the structure of all the tracks of the optical disk. In tracks $T_0$ to $T_p$ each denoting one round of the tracks: the track $T_0$ is the first one, i.e., the innermost one on the optical disk; the tracks $T_l$ to $T_m$ are those for areas 12 for storing the index data; and the tracks $T_n$ to $T_p$ are those for areas 13 for storing image data. An area 11 composed of the tracks $T_0$ to $T_{l-1}$ is used in its entirety to store the management information of the optical disk such as the values (the track numbers or the track address) of the tracks $T_l$, $T_m$, $T_n$ and $T_p$ indicating the boundaries of the data areas. In the index data storage area 12, the tracks $T_{m-2}$ to $T_m$ correspond to those of FIG. 2, and the index data $I_1$ to $I_{40}$ are written sequentially from the tail sector of the last track $T_m$ of the area 12, i.e., in the order reversed from the usual access order of the head. In the image data storage area 13, on the other hand, image data $D_1$ to $D_{40}$ corresponding to the index data $I_1$ to $I_{40}$ are written sequentially from the first sector address of the first track $T_n$ of the area 13 in the usual access order of the head.

The process of storing the index data in the direction reversed from that of the aforementioned image data is conducted in the following manner.

Figure 4:
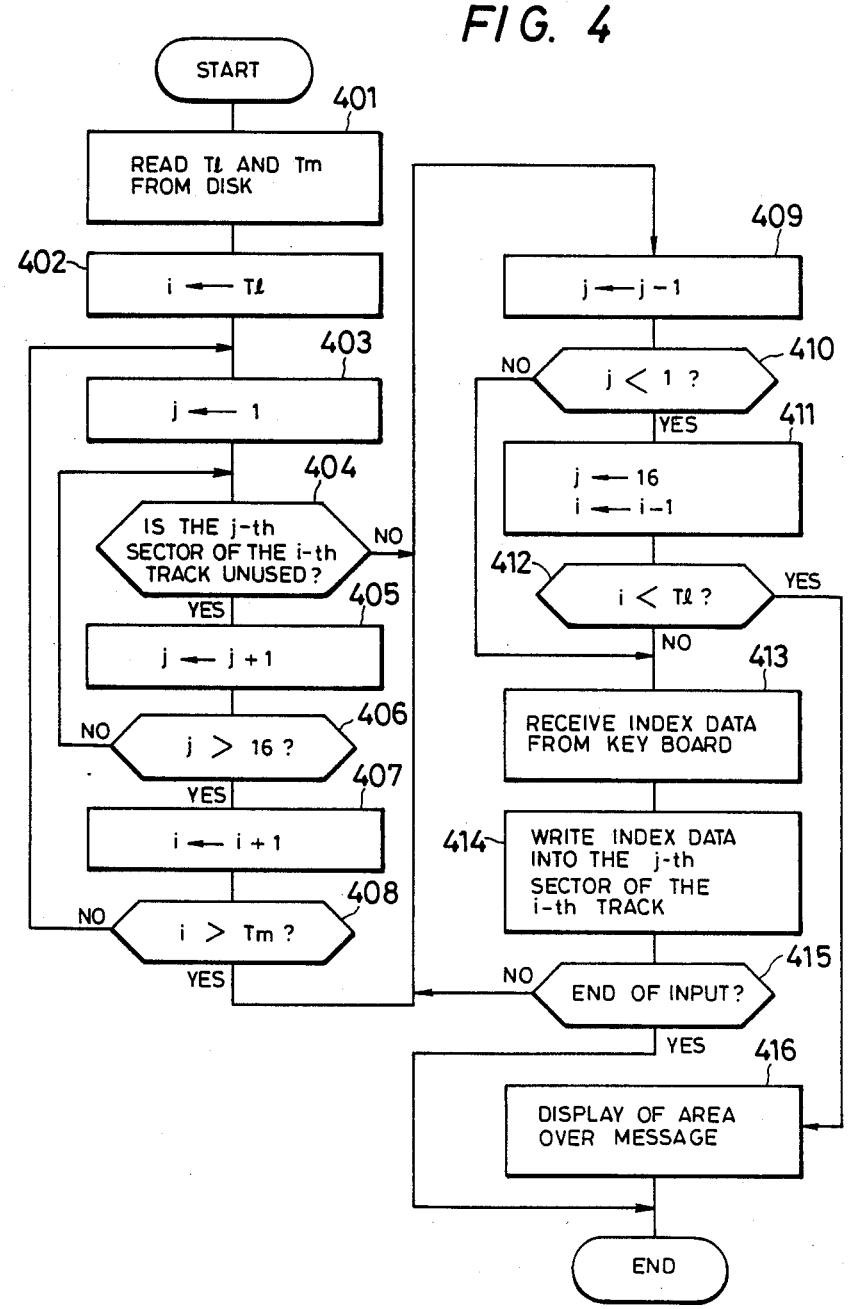
FIG. 4 is a flow chart showing a program for storing index data.

FIG. 4 is a flow chart showing the index data storing program to be executed by the data processor 2. At a first step 401, by reading the content of the management information track $T_0$ of the optical disk, the values of the tracks $T_l$ and $T_m$ are obtained and memorized in the internal memory. Next, at steps 402 to 408, the tracks on the optical disk are scanned sequentially from the track $T_l$ to retrieve the written sector detect first, i.e., the newest index data $I_{40}$ and to memorize the address of $I_{40}$ in the internal memory. Here, it is assumed that one track is composed of sixteen sectors, each of which can store the index data for one frame of image data. At steps 409 to 412, the address for storing an index data $I_{41}$ to be newly added, i.e., the sector address immediately preceding the newest index data $I_{40}$ registered on the optical disk is determined. The index data inputted from the keyboard 1 into the memory 6 at a step 413 are stored in the aforementioned sector address at a step 414. If the end of input is detected at a step 415, the processing sequence is ended. Otherwise, the processing is returned to the step 409, at which the address of the next sector for storing new index data is updated to repeat the aforementioned operations. When all the areas of the tracks $T_l$ to $T_m$ are used up, the program is ended at a step 415 by outputting an over message indicating the full storage to the display.

Although not shown, the processing can be switched to the data retrieval mode if a special command is detected at the step 413. Between the steps 412 and 413, moreover, the image data may be read from the image scanner 5 and written in the optical disk 3 through the memory 6. In this case, the address information of the image data on the optical disk is added to the index data between the steps 413 and 414.

Next, the retrieval of the image data using the aforementioned index data will be described in the following.

Figure 5:
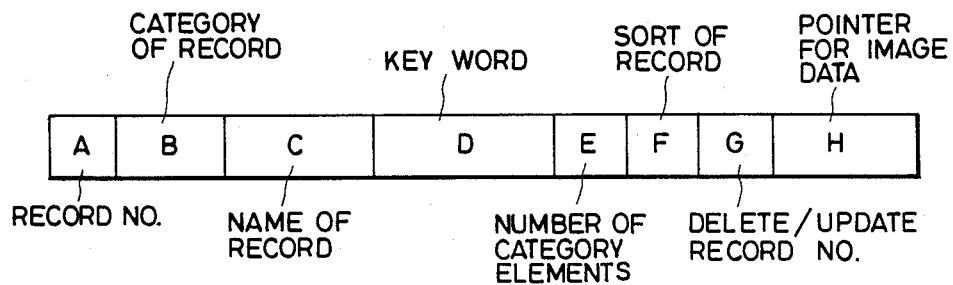
FIG. 5 is a record format showing one example of the structure of the index data.

In the data retrieval operation using the non-erasable type optical disk, it is better, for reasons to be stated later, to retrieve the index data sequentially in the reverse order of the registration thereof from the newest one. For example, FIG. 5 is a diagram showing recording format exemplifying the index data. In FIG. 5 reference letter A denotes a field for indicating the record number given to the image data in the order of registration and corresponding to the subscripts of the aforementioned $I_1$ to $I_{40}$ and $D_1$ to $D_{40}$; letter B denotes a field for indicating the category into which the record is sorted; letter C denotes a field for indicating the name of the record; numeral D denotes a field for indicating the keyword of the record; letter E denotes a field for indicating the number of category elements which belong to the record; and letter F denotes a field for indicating the number of records to be deleted or updated, and letter H denotes a field for indicating the pointer which indicates the address on the optical disk into which the image data corresponding to the index data is stored.

The non-erasable type optical disk can neither delete nor update physically the contents of the data once recorded. Therefore, the data registered later in another address while leaving the previous or original data on the disk have a more important meaning. In the example described above, for example, the item E denotes the number of the elements of the category (i.e., the content of the item B), to which the record belongs, when said record is registered. As a result, the item E of one of the previous records does not present a correct value in case another record of the common category is newly registered, in case a record for deleting the same is added or in case a record for updating the item B is added. In case a certain sorting item is designated to retrieve all records belonging thereto, this retrieval cannot be completed so long as all the records on the disk are accessed if a method for retrieving the records in the order of registration is adopted. If, on the contrary, the records are accessed in the order reversed from that of the registration thereof, the correct content of the item E can be grasped from the corresponding record sought first. When the corresponding records of this number are sought, the subsequent record retrieval can be omitted to shorten the time period for the retrieval. In case where one of the registered records is to be deleted, moreover, a new index record is prepared in which the record number of that old record to be deleted is assigned to the item G; the sort of record indicating that the corresponding old record has been deleted is assigned to item F; the value which is one less than the number of elements at the instant of deletion of the sort category belonging to the corresponding record is assigned to item E; and the remaining items are set at the same values as those of the items corresponding to that old record. The index record thus prepared is newly added to the area 12. According to the prior art method which accesses the index records in the order of registration in case all the records which correspond to the inquiry ar required to retrieve by designating the keywords or the like, it is impossible to judge whether the matched record is still effective or has been deleted already at the instant when it is accessed. That is, it is impossible to determine when corresponding records to be obtained until all the records in the data area are completely accessed. If, on the contrary, the index data is so registered that it can be retrieved from the newest one according to the present invention, it is possible to grasp the information prior to the access of a deleted record. As a result, all the corresponding records, for which the information showing the deletion of the record is not sought in the retrieving process, can be judged as those to be answered when they are accessed.

Thus, the retrieved records may be displayed sequentially on the display 7. In this case, in order to reduce the number of reciprocation of the head between the areas 12 and 13, all or a predetermined number of image data may be read at once from the area 13.

The description thus far is directed to the embodiment of the image file. However, the data to which the present invention is applicable need not be limited to image data. For example, the present invention can be applied to code data of character strings formed by a word processor by defining the index data like the aforementioned ones. The invention can also be applied to the code data themselves as an index having no body data. Incidentally, in the embodiment thus far described, the index data is inputted directly from the keyboard 1 of the file system. However, the index data may be first registered in an external memory such as a floppy disk or a magnetic tape and then inputted to the index area 14 as a whole. In this modification, plural index data can be edited on the memory 6 and written as a whole on the optical disk 3 sequentially from the newest one thereby to drastically shorten the time period for registering the indexes. In the description thus far provided, moreover, the present invention has been described with reference to a file system which uses as the information recording medium a nonerasable type optical disk. However, the advantage of the present invention is retained even in a file system using an erasable type optical or magnetic disk capable of physically erasing and rewriting data. On the other hand, the shape of the tracks should not be limited to the spiral configuration. For example, the present invention can be applied to a memory in which the head moving velocity is different between inward and outward directions.

As has been apparent from the description thus far provided, according to the present invention, the retrieval can be conducted efficiently by storing the sequential input data in the order reversed from that of the continuously readable/writable tracks and by reading the data sequentially from the newest record in the data retrieval mode.

What is claimed is:

1. A method for storing data in a rotary type recording medium rotating in a predetermined direction in which reading of information from a plurality of adjacent tracks is conducted at a higher speed when a head is moved in a first radial direction of said recording medium than that when said head is moved in a second radial direction opposite to said first radial direction, comprising the steps of:

rotating said recording medium in said predetermined direction;

obtaining a first address for indicating a location of the newest data block within a predetermined storage area including a plurality of tracks defined on said recording medium;

determining from said first address a second address for indicating a location to store a subsequent data block to be added to said storage area so that a plurality of data blocks are located to pass sequentially from the newest one through said head when said head is moved in said first direction; and writing the new data block into said recording medium by positioning said head at the location of said second address.

2. A data storing method according to claim 1, wherein said plural tracks continuously run in a spiral shape, and said second address is determined by setting as said first direction the head moving direction in which said head continuously follows said spiral.

3. A data storing method according to claim 2, wherein a medium on which it is impossible to rewrite data is used as said recording medium.

4. A method for storing data in a rotary type recording medium rotating in a predetermined direction in which reading of information from a plurality of adjacent tracks is conducted at a higher speed when a head is moved in a first radial direction of the recording medium than that when said head is moved in a second radial direction opposite to said first radial direction, said recording medium being defined with a first storage area for storing a plurality of data blocks and a second storage area for storing index blocks respectively corresponding to said data blocks, comprising the steps of:

rotating said recording medium in said predetermined direction;

writing a new data block in said first storage area which has already a formerly written data block so that the data blocks stored in said first storage area are so arranged as to pass through said head sequentially in the order from the formerly written block to the newest written data block when said head is moved in said first direction; and writing a new index block corresponding to said new data block in said second storage area which has already a formerly written index block so that the index blocks stored in said second storage area are so arranged as to pass through said head sequentially in the order from the newest written index block to the formerly written index block when said head is moved in said first direction.

5. A data storing method according to claim 4, wherein a medium on which it is impossible to rewrite data is used as said recording medium, further comprising the step of writing an index block including information for invalidating one of the data blocks already stored in said first storage area into said second storage area.

6. A data storing method according to claim 4, wherein said plural tracks continuously run in a spiral shape, and the arrangement of said data blocks and said index blocks are determined by setting as said first direction the head moving direction in which said head continuously follows said spiral.

7. A method for storing data in a recording system having a rotary recording medium and a head, said recording medium having a plurality of tracks continuously running in a spiral shape and being driven to rotate in a predetermined direction, said head being continuously accessible to a plurality of the tracks in one direction along with the spiral, the method comprising the steps of:

rotating said recording medium in said predetermined direction;

writing a new data block in a first storage area defined in said recording medium so that data blocks stored in said first storage area may be so arranged as to pass through said head sequentially in the order starting from a formerly written data block and proceeding to the newest data block in said one direction; and writing a new index block corresponding to said new data block in a second storage area defined in said recording medium so that index blocks stored in said second storage area are so arranged as to pass through said head sequentially in the order from the newest index block proceeding to a formerly written index block in said one direction.

* * * * *